United States Patent [19]

Ishida

[11] Patent Number: 5,333,053
[45] Date of Patent: Jul. 26, 1994

[54] APPARATUS FOR MEASURING STRAIGHTNESS

[75] Inventor: Akira Ishida, Tsuchiura, Japan

[73] Assignee: Nikon Corporation, Tokyo, Japan

[21] Appl. No.: 857,825

[22] Filed: Mar. 26, 1992

[30] Foreign Application Priority Data

Apr. 26, 1991 [JP] Japan ................. 3-096592

[51] Int. Cl.$^5$ ............................. G01B 11/00
[52] U.S. Cl. .................... 356/400; 356/152.1
[58] Field of Search ........... 356/373, 375, 399–400, 356/152, 128

[56] References Cited

U.S. PATENT DOCUMENTS 3,813,169  5/1974  Kaestner .................. 356/399 X
3,915,574  10/1975  Hernquist ................... 356/152

Primary Examiner—Richard A. Rosenberger
Assistant Examiner—K. P. Hantis
Attorney, Agent, or Firm—Shapiro and Shapiro

[57] ABSTRACT

Straightness is measured with high accuracy through the use of two laser beams of different wavelengths to thereby eliminate any measurement error due to deflection caused by the turbulence of a medium through which the laser beams propagate. An exemplary apparatus for measuring straightness is characterized in that two laser beams of different wavelengths are received by a position sensor, respective measured values including the amounts of deflection created in the two laser beams are sent to a calculating portion, and in the calculating portion, a calculating process of offsetting the amounts of deflection created in the laser beams from the two measured values is carried out to thereby detect the position of a stage and measure straightness.

3 Claims, 2 Drawing Sheets

F I G. 1
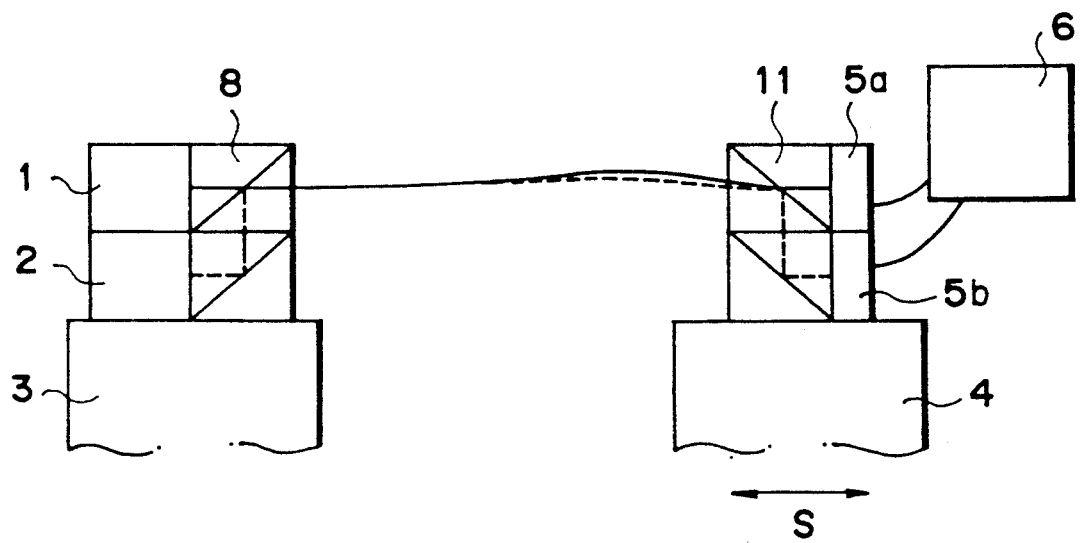
F I G. 2
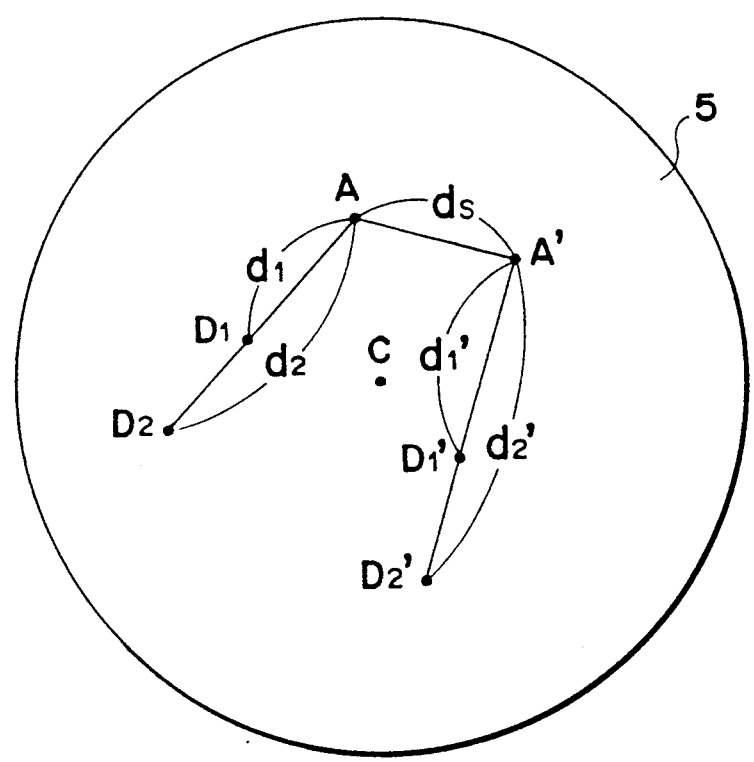

APPARATUS FOR MEASURING STRAIGHTNESS

BACKGROUND OF THE INVENTION

1. Field of the Invention

This invention relates to an apparatus for measuring straightness by the utilization of the rectilinear propagative property of a light beam. In the present invention, it is to be understood that the direction of travel of the light beam is the state of straightness and the amount deviating from said direction of travel is straightness. Description will hereinafter be made with an apparatus for measuring straightness utilizing a laser beam taken as an example.

2. Related Background Art

An apparatus using a laser beam in the measurement of straightness has the advantage that it can easily set a reference straight line during the measurement. FIG. 4 of the accompanying drawings schematically shows the construction of an apparatus for measuring straightness according to the prior art.

A laser light source 10 is fixed to a base portion 3. As the light source 10, use is made, for example, of an He-Ne laser. A stage 4 is movable in the direction of arrow S, and the movement thereof is the object of straightness measurement. A light position detector 5 for receiving the laser beam is installed on the stage 4. The light position detector 5 need not always be installed on the stage 4. For example, a reflecting mirror may be installed on the stage and reflected light from this reflecting mirror may be detected by a light position detector.

The origin C is set on the substantially central portion of the light receiving surface of the light position detector 5, and this origin C is used as the reference when the spot position is detected. The light position detector 5 comprises, for example, a four-division photodetector, and when the laser beam is applied to this sensor, a signal conforming to said spot position is sent to a calculating portion 6.

Description will now be made of a case where straightness is measured by the prior-art apparatus shown in FIG. 4. This apparatus measures the spot position on the light receiving surface of the light position detector 5 during the movement of the stage 4 to thereby detect the amount of displacement of this spot position as straightness.

The laser beam emitted from the light source 10 travels through a fluid medium such as air to the light position detector 5 and forms a spot. The light position detector 5 outputs a signal conforming to the position of the spot to the calculating portion 6. The stage 4 is moved by a predetermined distance and the then position of the spot is measured by the light position detector 5. If the stage 4 is moved in a straight direction, the position of said spot will not fluctuate. However, if the stage 4 is moved deviating from a straight direction, the position of said spot will be displaced. The calculating portion 6 finds the amount of displacement of the spot position caused by the movement of the stage 4 from the output value of said spot position output from the light position detector 5. With this amount of displacement as the amount of deviation from the straight direction relative to the direction of movement of the stage 4, straightness $d_s$ has been defined.

The prior-art the apparatus for measuring straightness as described above has suffered from the following problems.

The laser beam propagates through air or some other fluid when straightness is measured. However, the medium density of the fluid tends to cause a fluctuation (hereinafter referred to as the "turbulence") due to the irregularity of the flow or temperature of the fluid. Therefore, the refractive index of the fluid is not uniform but varies in a complicated way. Under such a state, the laser beam does not travel rectilinearly but exhibits deflection. For example, as shown in FIG. 4, the laser beam which is desired to travel rectilinearly as indicated by A and to enter the light position detector 5 actually travels as indicated by B. Also, the direction of said deflection varies with time as the turbulence fluctuates.

As a specific example, in the case of the interior of a room in which no special counter-measure is provided, when the laser beam travels forward by 1 m, there has sometimes been observed an amount of deflection of maximum about 40 μm relative to the straight direction. This value is greater than the order found during the measurement of straightness. Therefore, in an apparatus like the prior-art apparatus in which the spot position on the light position detector is used as the reference, such deflection results in measurement error, significantly reducing the accuracy of the measurement of straightness.

SUMMARY OF THE INVENTION

It is principal object of the present invention to solve the above-noted problems.

For the above object, the present invention firstly provides an apparatus for measuring straightness comprising:

a first light source emitting light of a wavelength $\lambda_1$ to a movable stage;

a second light source emitting light of a wavelength $\lambda_2$ differing from said wavelength $\lambda_1$ to said stage;

an optical system having a light position detector for receiving the light of said wavelength $\lambda_1$ and the light of said wavelength $\lambda_2$ having the position information of said stage, and outputting values $D_1$ and $D_2$ corresponding to the respective light receiving positions; and a calculating portion for outputting the amount of deviation $d_s$ of said stage from the state of straightness in accordance with the output values $D_1$ and $D_2$ measured by said light position detector and the following equation:

$$d_s = D_2 - K(D_2 - D_1),$$

where $K = (n_2 - 1)/(n_2 - n_1)$, $n_1$ is the refractive index for the light of the first light source, and $n_2$ is the refractive index for the light of the second light source (hereinafter the foregoing is referred to as a first apparatus of the invention).

The present invention secondly provides an apparatus for measuring straightness as described above and provided with:

means for dividing the light emitted from each of said light sources into two portions;

means for inverting the phase of the fluctuations in a first direction of one of the two portions with respect to a predetermined direction; and means for inverting the phase of the fluctuations in a second direction substantially orthogonal to said first direction of the other of the two portions with respect to said predetermined direction (hereinafter the foregoing is referred to as a second apparatus of the invention).

In fluid, said two laser lights are subject to different refractive indices due to the dispersion of the lights by the fluid. Therefore, a difference arises between the amounts of deflection of said two laser lights. Based on the research and development underlying the present invention, it was determined that a relationship between the amounts of deflection of the two light beams can be approximated on the basis of the dispersion characteristic of the medium and the wavelengths of the two beams.

FIG. 2 of the accompanying drawings shows the light receiving surface of the light position detector. Description will hereinafter be made supposing a case where the two light beams have entered the light receiving surface of one and the same light position detector. When the turbulence does not occur, neither of the two light beams is deflected and the positions of their spots become the same position. This spot position is defined as a point A. Also, when the laser light of the first light source and the laser light of the second light source propagate through fluid, the amounts of deflection attributable to the turbulence of the fluid are defined as $d_1$ and $d_2$ and the spot positions are defined as $D_1$ and $D_2$. In this case, said spot positions $D_1$ and $D_2$ lie in the same direction relative to the point A. Between said $d_1$ and $d_2$, there is approximately established the relation that $d_2/(d_2-d_1)=K$ (constant value). Further, the value of K can be expressed as $K=(n_2-1)/(n_2-n_1)$ by the use of refractive indices. In this case, $n_1$ is the refractive index for the light of the first light source and $n_2$ is the refractive index for the light of the second light source.

Next, consider a case where the stage has been moved from the above-described state (hereinafter referred to as "a first state"). Let it be assumed that by said movement, the stage has been displaced relative to a first state (hereinafter this state will be referred to as "a second state"). When turbulence does not occur, the amount of said displacement is measured as straightness $d_s$ and the spot positions of said two laser beams lie at a point A'. When the deflection due to turbulence occurs, the amounts of deflection of the laser beam of the first light source and the laser beam of the second light source attributable to said turbulence are defined as $d_1'$ and $d_2'$, respectively, and the spot positions are defined as $D_1'$ and $D_2'$, respectively At this time, $D_1'$ and $D_2'$ lie in the same direction relative to the point A'. The spot positions $D_1$, $D_2$, $D_1'$ and $D_2'$ can each be represented by a vector having the point A as the starting point.

In the foregoing, $D_1'$ and $D_2'$ are the straightness $d_s$ from the point A in the first state plus the amounts of deflection of the respective laser beams. That is, the second state can be expressed as:

$$D_1' = AA' + A'D_1'$$
$$(= d_s + d_1')$$
$$D_2' = AA' + A'D_2'$$
$$(= d_s + d_2')$$

On the other hand, for $d_1'$ and $d_2'$, as well as for said $d_1$ and $d_2$, there is approximately established the following relation:
ti $d_2'/(d_2'-d_1')=K$ (constant value)

From said vector $d_1'$, $d_2'$ and the value K, straightness $d_s$ can be calculated by the following equation (1):

$$D_2' - K(D_2' - D_1') = \qquad (1)$$
$$d_s + d_2' - \frac{d_2'}{d_2' - d_1'}(d_s + d_2' - d_s - d_1') = d_s$$

If the calculation process as shown by equation (1) is carried out as described above, the value of straightness $d_s$ can be found independently of the amounts of deflection of the laser beams attributable to the turbulence caused by said fluid.

Further, in the second apparatus of the invention, the optical system is disposed so that even when the supported state of the mirror of the laser portion is fluctuated under the influence of the heat generation of the light sources themselves and the angles of emergence of the laser beams are varied, each of the fluctuated laser beams may be divided into two and said amounts of fluctuation may negate each other when each of the divided laser beams is received by the light position detector. Thus, the influence of the fluctuations of the laser beams which are caused by the light sources themselves can be reduced and the value of straightness $d_s$ can be found highly accurately.

As described above, in the first apparatus of the invention, any measurement error caused by a turbulence occurring to the propagation medium for the laser beams can be substantially eliminated. Also, in the second apparatus of the invention, besides the measurement error caused by the turbulence of the propagation medium, any measurement error caused by the fluctuations of the laser beams which in turn are caused by the light sources themselves can be substantially eliminated. As a result, it becomes possible to measure straightness with higher accuracy than in the prior-art apparatus utilizing a laser beam.

BRIEF DESCRIPTION OF THE DRAWINGS

FIG. 1 schematically shows the construction of a first embodiment of the apparatus for measuring straightness of the present invention.

FIG. 2 is a plan view showing the spot positions of laser beams on a light position detector in the present invention, and particularly shows a case where two laser beams form spots on one and the same sensor.

DESCRIPTION OF THE PREFERRED EMBODIMENTS

Figure 3:
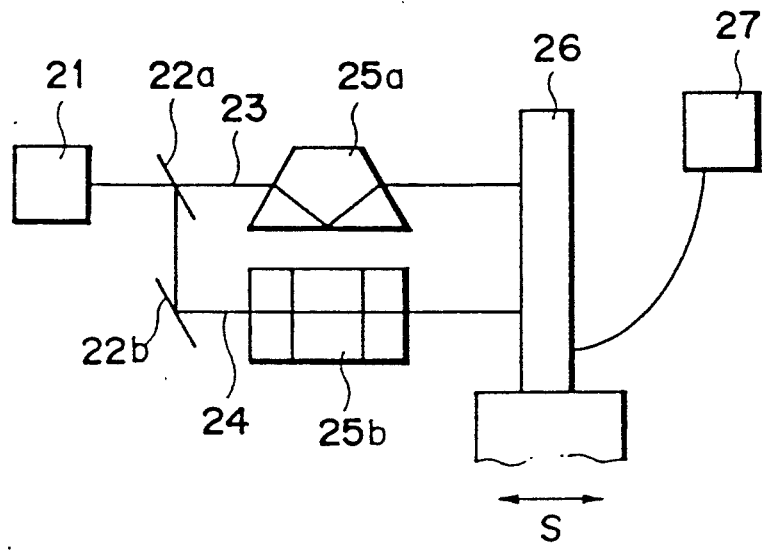
FIG. 3 is a schematic view illustrating the principle of compensating for the fluctuations of laser beams caused by light sources themselves in a second embodiment of the present invention.
Figure 4:
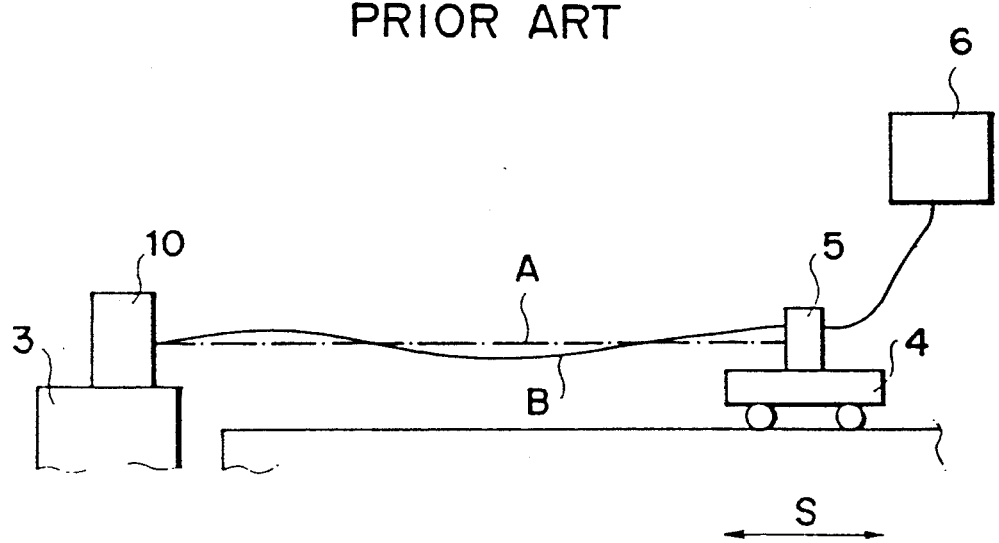
FIG. 4 schematically shows the construction of an apparatus for measuring straightness according to the prior art.

[First Embodiment (First Apparatus of the Invention)]

FIG. 1 schematically shows the construction of a first embodiment of the apparatus for measuring straightness of the present invention.

In the present embodiment, $Ar^+$ lasers are used as a first light source 1 and a second light source 2. The wavelength $\lambda_1$ of a first laser beam emitted from the first light source 1 is 488 nm. A laser beam emitted from the second light source 2 is made into a second high frequency by being passed through a non-linear crystal portion so that the wavelength thereof may be ½. Thus the wavelength $\lambda_2$ of the second laser beam is 244 nm.

An optical system 8 is installed near the light source 1 and the light source 2, and a reflecting mirror or a beam splitter and the non-linear crystal portion are provided so that positions at which the two laser beams emitted from the two light sources emerge from the optical system 8 may be coincident with each other. Both of the two light sources are fixed to a base portion 3.

A light position detector 5 having two four-division photodetectors is installed on a stage 4. A beam splitting portion 11 for splitting the two laser beams so that the two laser beams may form spots on the respective four-division photodetectors is installed near the light position detector 5 and on the incidence side of the laser beams. As regards the beam splitting method, the beams may be split in conformity with their wavelengths, for example, by dichroic mirrors, or prisms, polarizing beam splitters or the like.

Description will hereinafter be made of a case where straightness is actually measured. Laser beams are first emitted from the first light source 1 and the second light source 2, respectively, and enter the optical system 8. The first and second laser beams which have entered the optical system 8 have their emerging positions made coincident with each other when they emerge from the optical system 8. The two light beams travel through a fluid medium such as air and enter the beam splitting portion 11 installed on the stage 4. The light beams are divided into the first laser beam and the second laser beam by the beam splitting portion 11. These laser beams arrive at a light position detector 5a and a light position detector 5b, respectively, and form spots on the respective light receiving surfaces thereof. At this time, the amounts of deflection of the two laser beams in the medium through which they propagate differ from each other because the two laser beams differ in wavelength from each other as previously described. As a result, the two laser beams form beam spots at different positions on the light position detectors 5a and 5b. In order to avoid the influence of turbulence, design is made such that the two light beams which have entered the beam splitting portion 11 do not again pass through the fluid medium such as air.

The light position detectors 5a and 5b, as in the prior art, output the measured values $D_1$ and $D_2$ of the spot positions of the respective laser beams to a calculating portion 6. In the calculating portion 6, a calculation process based on the aforementioned mathematical expression is carried out to thereby calculate straightness relative to the movement of the stage 4.

While, in the present embodiment, the light sources of the first laser beam and the second laser beam are provided discretely from each other, a common light source may be provided instead of these two light sources. In such case, if a laser source emitting two beams of different wavelengths is used, it will be possible to obtain an effect similar to that of the present embodiment.

Further, design may be made such that the light source portion emits laser beams of different wavelengths at a sufficiently short period and the light receiving period of the light position detector receiving the laser beams is synchronized with the period of the light source portion. In such case, only a single light position detector is required and therefore, any measurement error of the light receiving positions of the two laser beams which would otherwise occur from the difference in accuracy between individual light position detectors can be eliminated.

Specifically, laser sources emitting laser beams differing in wavelength from each other and light intercepting means such as a shutter for periodically intercepting one of the laser beams while permitting each light source to emit a laser beam can be provided in the light source portion. Design is made such that the emitting positions of the respective laser beams in the light source portion are the same. Provision is further made of a light position detector for measuring the spot positions of the two laser beams of different wavelengths periodically changed over by the light intercepting means, in synchronized relationship with the period of the light intercepting means and in conformity with each wavelength. Also, provision may be made of synchronizing means for synchronizing the period of the light intercepting means with the measurement changeover period of the light position detector.

Thereby, laser beams differing in wavelength from each other are intermittently emitted at a sufficiently short period from the light source portion. The light position detector outputs to the calculating portion the measured value of the spot position of each laser beam received in synchronism with the period in the light source portion, whereby straightness is calculated as previously described.

Instead of providing the light intercepting means in the light source portion, it is also possible to prepare a laser source periodically emitting a laser beam for each wavelength, and change over the laser sources to thereby cause the laser beam of each wavelength to be intermittently emitted. In such case, a pulse-like emission signal can be imparted to each laser source and therefore, a complicated constituent such as a shutter mechanism need not be provided. The light position detector can be designed to measure the spot position of the laser beam of each wavelength received in synchronism with the emission signal.

In the present embodiment, design is made such that the straightness relative to the movement of the stage between two points is measured during the measurement of straightness. In this case, in the calculating portion, the difference between the spot positions detected at the two points is taken to thereby judge straightness.

Also, the present embodiment has been described with respect to a case where the light position detectors are provided on the stage, whereas the present invention is not restricted thereto. For example, a reflecting mirror may be installed on the stage and it is possible to obtain a similar effect even if the reflected light from this reflecting mirror is detected by a light position detector.

[Second Embodiment (Second Apparatus of the Invention)]

FIG. 3 schematically shows the construction of a second embodiment of the present invention, and particularly shows the construction regarding one of two laser beams of different wavelengths used in the present invention. The present embodiment prevents a reduction in measurement accuracy occurring because the light source of the laser beam itself generates heat, whereby the supported state of the mirror of the light source fluctuates and the angle of emergence of the laser beam changes.

A laser beam emitted from the light source 21 is divided into two laser beams 23 and 24 by dividing means comprised, for example, of a half mirror 22a and a mirror 22b.

After the division, one laser beam 23 passes through a dove prism 25a and the other laser beam 24 passes through a dove prism 25b, and they form spots on the light receiving surface of a light position detector 26 in a state in which they are substantially parallel to each other.

Assuming a plane perpendicular to the direction of emergence of the laser beam emitted from the light source 21, XY coordinates on axes orthogonal to each other can be set.

The origin of the XY coordinates is defined as the direction of emergence of the laser beam when there is not fluctuation.

The two dove prisms are disposed so that the X axis of the coordinates may be inverted by the dove prism 25a and the Y axis of the coordinates may be inverted by the dove prism 25b.

By the above-described arrangement, the laser beam emitted from the light source 21 which involves said fluctuation forms spots on the light receiving surface of the light position detector as two laser beams, i.e., a laser beam having said fluctuation phase-inverted in X direction by the dove prism 25a and a laser beam having said fluctuation phase-inverted in Y direction by the dove prism 25b.

The light position detector 26, when it detects two spot positions, sends substantially the centroid positions of these two spot positions as position signals to a calculating portion 27.

Therefore, regardless of the direction of said fluctuation, said fluctuation is negated and there can be obtained a position signal similar to that in the case of the spot position when a laser beam having no fluctuation is received.

As described above, according to the present embodiment, besides the deflection occurring when the laser beam travels through fluid such as air, the fluctuation of the angle of emergence of the laser beam can be compensated for and thus, it becomes possible to effect the measurement of straightness highly accurately.

In the present embodiment, the dividing means is comprised of a half mirror and a morror, but this is not restrictive. For example, two dove prisms may be combined together to serve for the division of the laser beam and the inversion of the phase relative to one laser beam after the division.

What is claimed is:

1. An apparatus for measuring straightness, comprising:
   light source means for emitting first light of a wavelength $\lambda_1$ and second light of a different wavelength $\lambda_2$;
   dividing means for dividing each of said first light and said second light into two portions;
   phase inverting means for inverting the phase of deviation in a first direction of one of said two portions of each of said first light and said second light relative to a predetermined direction, inverting the phase of deviation in a second direction substantially orthogonal to said first direction of the other of said two portions of each of said first light and said second light relative to said predetermined direction, and emitting the two portions of each of said first light and said second light toward a movable stage;
   an optical system for mounting on the movable stage, and including light position detecting means for receiving the emitted first light and second light and outputting a value $D_1$ corresponding substantially to a centroid position of said two portions of said first light received at said light position detecting means and a value $D_2$ corresponding substantially to a centroid position of said two portions of said second light received at said light position detecting means; and
   calculating means for calculating an amount of deviation $d_s$ of the stage from a state of straightness in accordance with the output values $D_1$ and $D_2$ from said light position detecting means and the following equation:

$$d_s = D_2 - K(D_2 - D_1),$$

where $K = (n_2 - 1)/(n_2 - n_1)$, and $n_1$ and $n_2$ are the respective refractive indices, for said first light and said second light, of a medium through which said first light and said second light travel to said light position detecting means.

2. An apparatus according to claim 1, wherein said first light and said second light are emitted by a single light source.

3. An apparatus according to claim 1, wherein said light source means includes a pair of light sources, each emitting a respective one of said first light and said second light.

* * * * *